(12) United States Patent
Wang et al.

(10) Patent No.: US 10,624,017 B2
(45) Date of Patent: Apr. 14, 2020

(54) METHOD FOR OPERATING A COMMUNICATION APPARATUS AND COMMUNICATION APPARATUS

(71) Applicant: SIGNIFY HOLDING B.V., Eindhoven (NL)

(72) Inventors: Xiangyu Wang, Eindhoven (NL); Armand Michel Marie Lelkens, Heerlen (NL); Rick Van Haasen, Eindhoven (NL); Zhizhong Zhang, Shanghai (CN); Peiliang Dong, Shanghai (CN); Rong Fan, Shanghai (CN); Peter Fitski, Helmond (NL); Emmanuel David Lucas Michael Frimout, Nuenen (NL); Robert Cornelis Houtepen, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 62 days.

(21) Appl. No.: 16/069,041

(22) PCT Filed: Jan. 3, 2017

(86) PCT No.: PCT/EP2017/050084
§ 371 (c)(1),
(2) Date: Jul. 10, 2018

(87) PCT Pub. No.: WO2017/121660
PCT Pub. Date: Jul. 20, 2017

(65) Prior Publication Data
US 2019/0028953 A1    Jan. 24, 2019

(30) Foreign Application Priority Data

Jan. 11, 2016    (EP) .................................... 16150775

(51) Int. Cl.
*H04W 40/12* (2009.01)
*H04W 28/02* (2009.01)
(Continued)

(52) U.S. Cl.
CPC ......... *H04W 40/125* (2013.01); *H04L 1/1825* (2013.01); *H04L 1/1887* (2013.01);
(Continued)

(58) Field of Classification Search
CPC ... H04L 12/1877; H04L 1/1887; H04L 47/28; H04W 28/0236; H04W 40/24
See application file for complete search history.

(56) References Cited

U.S. PATENT DOCUMENTS

2010/0302945 A1    12/2010 Leppanen et al.
2015/0271062 A1    9/2015 Vijayasankar et al.

*Primary Examiner* — Kevin C. Harper
*Assistant Examiner* — Henry Baron

(57) ABSTRACT

The present invention relates to a method for operating a communication apparatus in a network comprising a plurality of communication nodes, upon reception of a message at the communication apparatus, the communication apparatus starting a retransmission delay being selected at random from a retransmission delay interval, said retransmission delay interval being dependent on at least one of a status of the communication apparatus and a property of the received message, the communication apparatus monitors retransmissions of said message by other communication nodes during said retransmission delay and the communication apparatus transmitting a retransmission of said message at the expiry of said retransmission delay if a statistic based on the retransmissions of said message by other communication nodes is below a threshold.

11 Claims, 4 Drawing Sheets

(51) Int. Cl.
  *H04W 40/24* (2009.01)
  *H04L 12/841* (2013.01)
  *H04L 12/18* (2006.01)
  *H05B 37/02* (2006.01)
  *H04L 1/18* (2006.01)
  H04L 12/721 (2013.01)
  H04W 84/18 (2009.01)
(52) U.S. Cl.
  CPC ...... *H04L 12/1877* (2013.01); *H04L 12/1881* (2013.01); *H04L 47/28* (2013.01); *H04W 28/0236* (2013.01); *H04W 40/24* (2013.01); *H05B 37/0272* (2013.01); *H04L 45/127* (2013.01); *H04W 84/18* (2013.01)

METHOD FOR OPERATING A COMMUNICATION APPARATUS AND COMMUNICATION APPARATUS

CROSS-REFERENCE TO PRIOR APPLICATIONS

This application is the U.S. National Phase application under 35 U.S.C. § 371 of International Application No. PCT/EP2017/050084, filed on Jan. 3, 2017, which claims the benefit of European Patent Application No. 16150775.1, filed on Jan. 11, 2016. These applications are hereby incorporated by reference herein.

FIELD OF THE INVENTION

The present invention relates to communication network and for example wireless communication networks including a plurality of communication apparatuses forming communication nodes of the network, in an example a lighting network.

BACKGROUND OF THE INVENTION

From the field of mesh networks it is known to transmit broadcast or flooding messages, for example U.S. 2010/0302945 A1 discloses a method for providing a collaborative reply over an ad-hoc network, more in particular this document also shows how such an approach can be used for efficiently locating and organizing information and associated context in a local environment With the current trend for example in wireless lighting for buildings, the number of communication nodes in a network increases and it is not uncommon for example there are more than 500 luminaires on a single floor. This trend leads to very dense networks. In addition, the transmission range of modern radio chips is pretty satisfactory. For example, it is not uncommon to have radio chips of around 20-30 meters of transmission range for typical office indoor environment.

With such a transmission range, such a communication network can be characterized as dense electrical installations since there is typically a luminaire installed every 2-4 meters. As a result, in some networks, a communication apparatus can easily hear 100+ other communication nodes within one transmission range.

Further, some mesh network mechanisms cause a large amount of interference due to the retransmission requirement for each communication node in the network receiving messages relative to these mechanisms, such as message broadcast (for configuration or alert purpose) or route discovery mechanisms. It is required to use some countermeasures to reduce the intensity of the broadcast storms. However, these countermeasures should not slow down the network or reduce its efficiency.

SUMMARY OF THE INVENTION

It is an object of the invention to propose a method for operating a network which alleviates the above identified problems.

It is another object of the invention to propose a communication apparatus which enables to control the amount of interference without hampering the operation of the network.

It is another object of the invention to propose a solution maintaining a good efficiency of the network, while reducing or controlling the load of communication nodes in a dense network.

To this end, in accordance with a first aspect of the invention it is proposed a method for operating a communication apparatus in a network comprising a plurality of communication nodes, upon reception of a message at the communication apparatus, the communication apparatus starting a retransmission delay being selected at random from a retransmission delay interval, said retransmission delay interval being dependent on at least one criterion including at least one of a status of the communication apparatus and a property of the received message, the communication apparatus depending on said criterion, monitoring retransmissions of said message by other communication nodes during said retransmission delay, and the communication apparatus deciding on transmitting a retransmission of said message at the expiry of said retransmission delay.

Thus, the communication apparatus can decide not to participate to the retransmissions of messages depending on its status, or to select a longer delay to allow other more suitable communication nodes to participate first. This can reduce the amount of interference caused by the retransmissions of such message. Besides, the retransmission delay interval may be adjusted for each communication apparatus depending on some conditions (intrinsic to the communication apparatus or to the communication conditions). Thus, some network apparatus may have higher priority when retransmitting by having smaller retransmission delays. This enables that the efficiency of the network can be maintained. The randomness of the delay selection however ensures some load diversity in the network, enabling the various communication nodes to participate in the retransmissions and the data packet routing.

The communication apparatus, depending on said criterion, monitors retransmissions of said message by other communication nodes during said retransmission delay.

As a consequence, in this embodiment, the communication apparatus can prevent to retransmit the message for example if the message has been already retransmitted at least a number of times defined by the threshold. Other statistic may be used to be compared with the threshold. Thus, the amount of interference can be further reduced.

In an example of the first aspect of the invention, the step of monitoring retransmissions of the said message during said retransmission delay is carried out unconditionally.

In an example of this first aspect of the invention, the communication apparatus decides to transmit a retransmission of said message at the expiry of said retransmission delay if a statistic based on the retransmissions of said message by other communication nodes is below a threshold. Thus, the decision is taken on the fly, enabling reduction of interference and channel occupation, while keeping networking flexibility and robustness.

It is to be noted that the threshold may predetermined, or adjusted depending on the local conditions of the network. For example, if the network is experiencing local congestion, then the threshold can be set a low value (e.g. a single overheard retransmission is enough to cause the communication apparatus preventing retransmission). If the network is however experiencing locally packet loss (for example if the network density is locally scarcer), the threshold may be set to a higher value.

In the sense of the invention, the retransmissions of the message may be mere repetition of the message, for example in the case of broadcast of configuration information. In this case, the message and its retransmissions are identical.

However, the retransmissions of the message may also include the relaying or forwarding of a message, where the retransmitted message includes some changes compared to the initial message. In the case of a route discovery for example, each retransmission may include additional data (e.g. address of intermediate nodes), or modified data (e.g. hop count update), but the retransmissions are still logically linked to the original message (e.g. they are part of the same route discovery).

In accordance with an exemplary embodiment of the first aspect of the invention, the communication apparatus comprises a neighbour table listing a plurality of communication nodes in communication range with the communication apparatus, wherein the status of the communication apparatus is based on the remaining capacity of the neighbour table of the communication apparatus.

Similarly, in another example which can be combined with all the preceding examples, wherein the communication apparatus comprises a routing table listing a plurality of routes to communication nodes, wherein the status of the communication apparatus is based on the remaining capacity of the routing table of the communication apparatus.

Thus, these examples ensure that the load of the communication apparatus can be controlled, for example to prevent that a communication apparatus has its neighbour table or its routing table filled due to incoming messages.

In a further example of this first embodiment, the status of the communication apparatus can take a value of at least the following states:
  Neighbour table full;
  Routing table full;
  Remaining space in the neighbour table;
  Remaining space in the routing table.

Further states may be included in the list of states of the communication apparatus. Based on these states, a corresponding retransmission delay interval (or set of intervals) is selected by the communication apparatus. Such delay can be infinite, in which the retransmission will not take place at all.

In all the examples of the first embodiment, the retransmission delay interval may include greater retransmission delay values for lower remaining capacity of the routing table or of the neighbour table.

Thus, a communication apparatus with a full routing/neighbour table will select its random retransmission delay in a corresponding delay retransmission interval having higher values. It is then likely that it gets a longer retransmission delay, so other communication nodes in its vicinity may retransmit earlier, preventing the communication apparatus to retransmit and eventually to have to add another entry to its routing/neighbour table (possibly including having to remove an entry as a replacement).

In an example of the above, all the values of the retransmission delay interval are greater for lower remaining capacity of the routing table or of the neighbour table than the values of the retransmission delay interval for greater remaining capacity of the routing table or of the neighbour table. Thus, the different retransmission delay intervals being not overlapping, this ensures that the communication apparatus will always transmit after other communication nodes having emptier routing/neighbour tables. However, having some overlap in the time intervals may also cause some more randomness in the load diversity in the network and can be beneficial depending on the application.

In accordance with another variant of this embodiment that can be combined with all the examples, the status of the communication apparatus can take the value of bottleneck communication node. The retransmission delay interval corresponding to this state value includes lower values than for other statuses. This enables adapting the network to particular topologies. This state may be preconfigured or configured by the installer for some communication apparatuses of the network, for example communication nodes in a corridor for which a robust and efficient communication link needs to be maintained. In another variant, this state may be assigned dynamically when the system discovers that some communication nodes can only be accessed by these bottleneck communication nodes. In this case, it is beneficial that such bottleneck communication nodes are of higher priority compared to neighbouring communication nodes, avoiding having a long wait-and-listen only period.

In accordance with another exemplary embodiment of the invention, which can be combined with the variants detailed above, the property of the received message is an indication of a link quality between the communication apparatus and a transmitting communication node transmitting said message. Thus, depending on the link quality between the communication apparatus and the communication node that has transmitted the message, different corresponding retransmission delay intervals are used for the random selection of the retransmission delay. It is then possible to give priority (by assigning the retransmission delay interval having the smaller values) to some route types.

In an example of this embodiment, the retransmission delay interval includes lower retransmission delay values if the link quality is above a first threshold. Thus, the communication nodes experiencing poor communication conditions with the initial transmitting communication node are to wait longer, enabling other communication nodes to retransmit first.

In another example of this embodiment, in order to ensure that the hops are not too small while maintaining the communication quality, the retransmission delay interval includes lower retransmission delay values if the link quality is included within a preferred link quality range. Indeed, if the link quality is neither too small nor too high, this ensures that the communication will be robust enough, while the hop length (the distance from the previous communication to the communication apparatus) is not too small, which could otherwise lead to a too high number of hops in the route.

In all the embodiments detailed above, the message can be a route discovery request used to record a route in the network between a source communication node and a destination communication node. In fact, these examples of the invention are beneficial for routing messages in general, and for example to route discovery requests as they generate an important amount of bandwidth usage. Thus, some embodiments of the invention could be limited to the handling of routing messages only. Other embodiments could be beneficial for other types of message that generate interference or bandwidth usage.

In accordance with a second aspect of the invention, it is proposed a communication apparatus comprising
  a transceiver adapted to communicate with other communication nodes of the network, said transceiver including a receiver and a transmitter,
  a controller adapted to, upon reception of a message by the receiver, start a retransmission delay being selected at random from a retransmission delay interval, said retransmission delay interval being dependent on at least one criterion including at least one of a status of the communication apparatus and a property of the received message, the communication apparatus depending on said criterion, monitoring retransmissions of said message by other communication nodes during said retransmission delay, and said controller deciding to generate a retransmission of said message to be transmitted by said transmitter of said message at the expiry of said retransmission delay.

All the variants of the first aspect of the invention are equally applicable to this second aspect of the invention.

It is to be noted that the first aspect of the invention may be implemented by computer, and thus, another aspect of the invention relates to a computer program product comprising a set of instructions adapted to, when executed by a processing unit, to cause said processing unit to carry out the method of the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
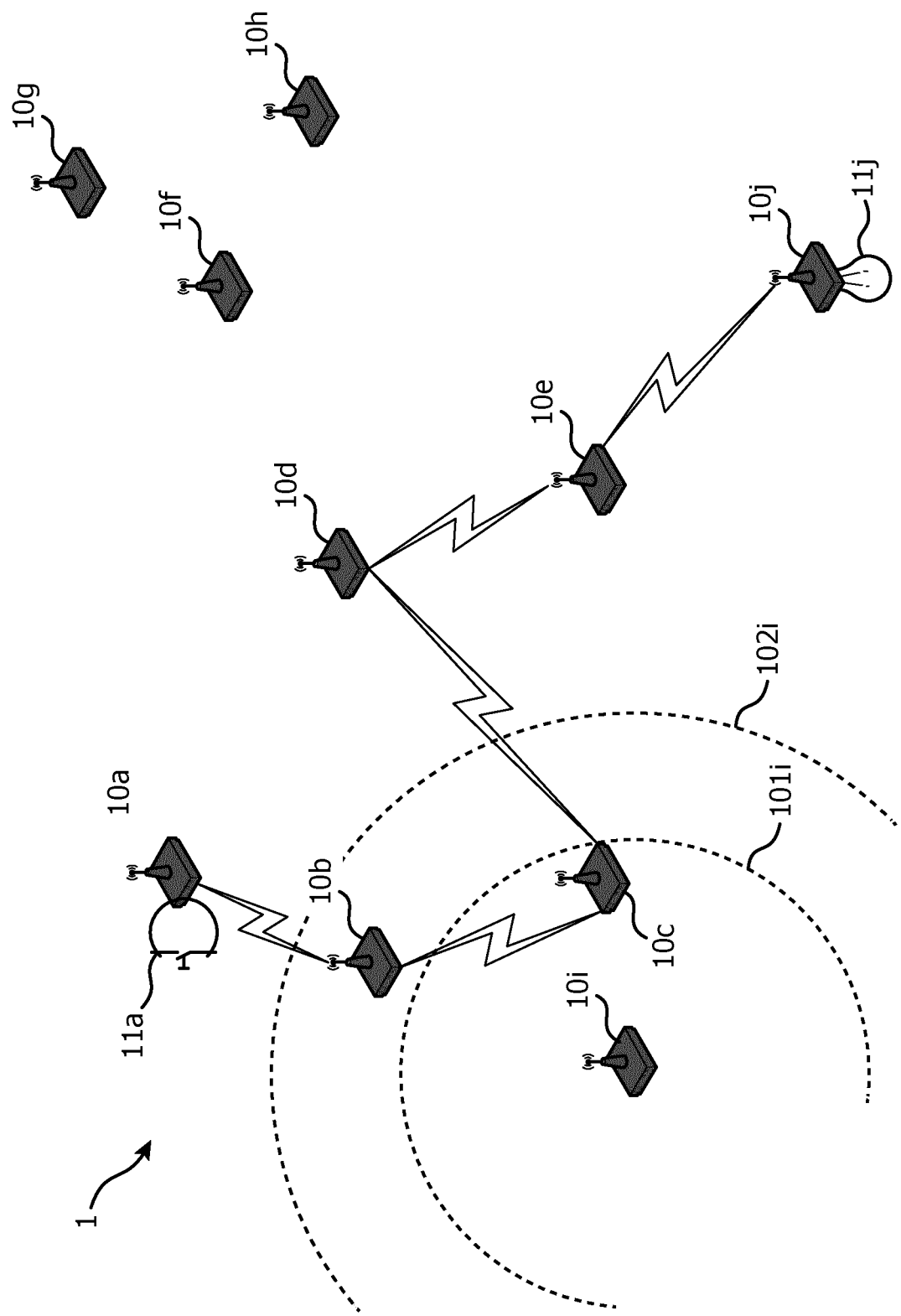
FIG. 1 is a block diagram of a communication network in which an embodiment of the invention is implemented.

The present invention relates to a communication apparatus being used for example in a communication network 1 represented on FIG. 1.

In this communication network 1, a plurality of communication apparatuses forming communication nodes 10a-j are communicating in the network 1. When a communication node 10a needs to transmit a data message to a distant communication node 10j that is not in range, the data message is forwarded or relayed by forwarding communication nodes. For example, in the case of a data message from communication node 10a to communication 10j, the data message is relayed by communication nodes 10b, then 10c, then 10d, then 10e until it reaches communication node 10j. These communication apparatuses may be used in actuators, for example to control luminaires in a lighting network. Thus, the communication apparatus 10a may be associated with a switch 11a (e.g. a wall switch, a presence sensor, a luminosity detector) to send commands which are received by communication apparatus 10j to control an associated luminaire 11j.

Figure 2:
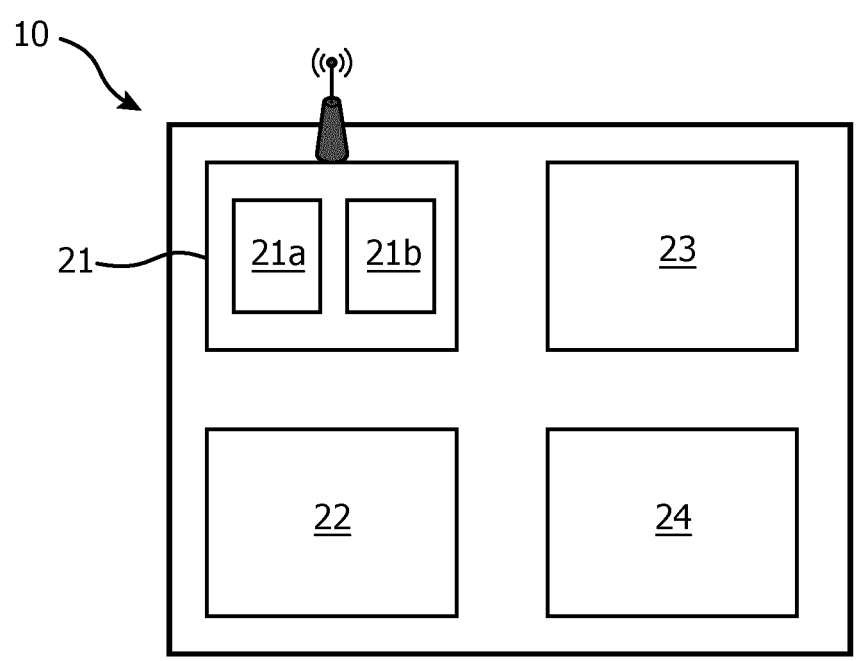
FIG. 2 is a block diagram of a communication apparatus in accordance with an embodiment of the invention.

To assist in this routing, as shown on FIG. 2; a communication apparatus 10 comprises a transceiver 21 including a transmitter 21a and a receiver 21b, for example an RF unit coupled to an antenna, a memory 22 which may store a respective routing table and the configuration data relevant for the operation of the transceiver. The routing table lists a plurality of routes (for example hop list) for routing data packets.

As shown on FIG. 2, the communication apparatus 10 also comprises a controller 23 to operate the transceiver 21, in association with the memory 22, for example, a ZigBee module based on IEEE802.15.4. Further, the communication apparatus can include a measurement unit 24 to carry out some measurements on the control messages to estimate the link quality with other communication nodes.

In accordance with a first embodiment of the invention, the network 1 may be a ZigBee mesh network and the communication apparatuses may operate in accordance with the ZigBee network protocol in this example. However, it is to be noted that the embodiments of the invention are readily applicable to other similar network protocols.

In ZigBee unicast routing, a communication node that initiates a route discovery procedure will need to transmit the initial route request message 4 times. An intermediate communication node that is not the destination communication node of the route request will need to re-transmit the route request message 3 times, separated by 254 ms. For each re-transmission of the route request message, it applies a random delay between 2 ms and 128 ms in accordance with the ZigBee protocol. The transmission of a route request message occupies an air time of a couple of milliseconds including a back off waiting time under normal network traffic loads. However, when a lighting network is dense, all neighbouring nodes (e.g. 100 nodes) will start the re-transmission of the route request message within a short delay time window, and the channel becomes overloaded.

On the other hand, in such dense conditions, it is completely unnecessary that all communication nodes need to be active in the unicast routing process, since there are more than enough routers to help in the unicast routing. Therefore, in accordance with the aspects of the invention, it is proposed that an adaptive and on-the-fly decision is made during the route discovery process about whether a communication apparatus should participate to the on-going route discovery process or not.

Therefore, in accordance with the first embodiment of the invention, a communication apparatus would listen during the retransmission delay before its own re-transmission starts, in contrast to current ZigBee standard specifications, where a communication node only needs to wait but does not need to listen. During this monitoring period, the communication apparatus collects how many neighbouring communication nodes have already re-transmitted the message, here the on-going route discoveries. If the number of retransmissions exceeds a threshold, the communication apparatus may voluntarily decide not to participate in this ongoing route discovery process as there are already enough communication apparatus that have participated already. It is to be noted that the above mentioned threshold may be absolute, i.e. an absolute value to be compared with the total number of overheard retransmissions. In a variant, this number may relative, for example a percentage number of neighbours. For example, if 50% or more of the neighbour communication nodes listed in the neighbour table have re-transmitted this route discovery, then the communication apparatus will prevent itself from retransmitting the route discovery message.

The communication apparatus refraining from re-transmitting the route request message may also clear the corresponding state information stored in e.g. its route discovery table if the information is not to be used anymore.

As a result, depending on the threshold value that has been set either statically or by a network management server, the number of communication nodes that actually participate to a route discovery process as a ZigBee router can be controlled. Therefore, for a given route discovery, only a subset of communication apparatus will become a ZigBee route for this route discovery, which greatly reduces the congestions of route request messages if all communication apparatus behave as ZigBee routers.

Therefore, this embodiment of the invention proposes a local procedure when executed on a communication node that prohibits the communication node from participating in the ongoing network management functions (such as unicast routing, multicast or broadcast routing) temporarily, and may clear related state information in the routing table for example. Besides, this listen-before-act method is used to determine whether to invoke the local procedure of preventing from transmitting.

The "listening" or "monitoring" part is defined as a waiting period in which a communication apparatus listens to ongoing network management activities of neighbouring communication nodes such as whether a communication node has sent a route request, or a re-broadcasting of a data message.

As explained above, the embodiment includes a monitoring step which relies on the observations and may include collecting measurements of neighbouring communication nodes by the communication apparatus. Such observations and measurements include for example which neighbour has already performed transmission or re-transmission of route requests, or a data packet, and statistics of neighbour's activities. The measurements may also include statistics of the channel, e.g. the channel occupation ratio during the listening period, the queue length of transmission queues, or the used space of routing tables. One or more of these statistics may be used to decide on the retransmission. It is to be noted that this step may be omitted depending on the determined criterion, for example the status of the communication apparatus and in particular its neighbour/routing tables.

Then, the communication apparatus can make a decision based on the statistics made, and a set of rules. A simple rule could be an absolute threshold value (e.g. total number of route requests being re-transmitted) or a relative threshold value (e.g. the percentage of neighbours among all known neighbouring nodes that have already re-transmitted a route request). The rule could be also a logic combination of the above simple rules.

If the decision is positive, then the network management function will be temporarily held off from being conducted. For example, such action may be that the communication apparatus will refrain from re-transmitting the current on-going route request, or a data broadcast packet.

In a second embodiment of the invention, which may be combined with the first embodiment, a communication apparatus in accordance with this example adapts its retransmission delay based on the link quality of the route request received from the transmitting communication apparatus. To this end, in an example of the invention, the communication apparatus of FIG. 2 uses its measurement unit 24 to carry out some measurement on the received message to estimate its quality.

The link quality is in this example estimated by the measurement unit 24 at the reception of the message, for example based on RSSI. Other characteristics could be used, e.g. SIR, BER or the like. Conversely, the communication apparatus may send at regular interval a kind of beacon or heartbeat message, which is replied by all the overhearing communication nodes, for example with an indication of the link quality they perceived. The received link quality is then stored in the memory 22 and upon reception of a message from a corresponding communication node, the respective value of link quality is retrieved.

In a variant of this embodiment, a low link quality would cause the communication apparatus to select the delay from an interval having higher values. For example, the communication apparatus would select randomly a retransmission delay from the corresponding intervals:

| Estimated Quality | Retransmission delay interval |
| --- | --- |
| −50 dBm to 0 dBm | 2 ms-128 ms |
| <−50 dBm | 128 ms-256 ms |

More quality ranges and corresponding delay intervals may be used.

In a variant of the above embodiment, both low link quality and high link quality shall increase the delay. Indeed, for routes that include a low quality link, the packet loss is likely to be high. However, high link quality may not be optimal since using very good links probably means that nodes are very close to each other and that short hops are used, so more hops are needed to reach the destination. In both cases, longer delay will give other communication nodes with medium quality links priorities to retransmit first and thus low-quality or high-hop-count routes are avoided.

A corresponding table of intervals may be as follows:

| Estimated Quality | Retransmission delay interval |
| --- | --- |
| >−20 dBm | 128 ms-256 ms |
| −20 dBm to −50 dBm | 2 ms-128 ms |
| <−50 dBm | 200 ms-300 ms |

Figure 3:
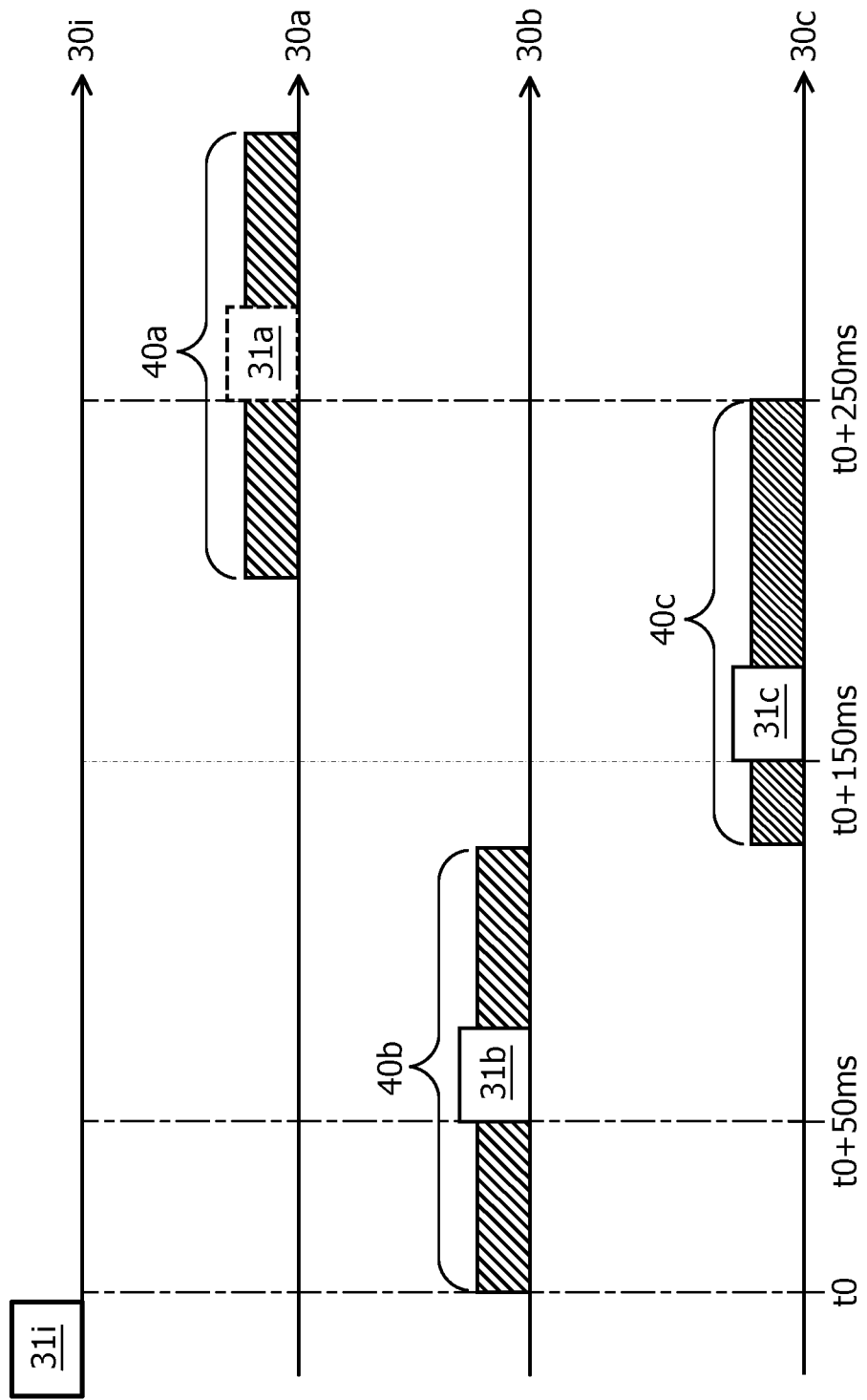
FIG. 3 is a time diagram representing the timing of the transmissions for two communication nodes in accordance with an embodiment of the invention.

The operation of communication nodes 10a, 10b and 10c are represented on FIG. 3. In this example, the communication node 10i broadcasts a message 31i to the network at t0 on FIG. 3 represented on the timeline 30i. The corresponding thresholds mentioned in the table above correspond to the ranges 101i and 102i. The estimated quality for this message for each of communication nodes 10a, 10b and 10c respectively is given below:

| Node ID | Estimated Quality | Retransmission delay Interval | Retransmission delay |
| --- | --- | --- | --- |
| 10a | −63 dBm | 200-300 ms | 250 ms |
| 10b | −42 dBm | 2-128 ms | 50 ms |
| 10c | −10 dBm | 128-256 ms | 150 ms |

Once the quality of the links has been estimated, a retransmission delay is selected at random from the corresponding retransmission delay intervals, here 250 ms for 10a, 50 ms for 10b and 150 ms for 10c.

As shown on FIG. 3, after the reception of the data message at t0, all the communication nodes 10a-c monitor the channel until the expiry of their respective retransmission delays 30a, 30b and 30c. The delay intervals out which said retransmission delays have selected at random are represented respectively by the ranges 40a, 40b and 40c on the respective timelines 30a-c; which represent the respective transmission activity of the communication nodes 10a-c.

At t0+50 ms, communication node 10b has not overheard any retransmission of the initial message, and thus retransmits the message for the first time as message 31b on timeline 30b. This retransmission is overheard by the other communication nodes 10a and 10c which then increment their respective statistic (here a counter of retransmission). The threshold being set at 2 retransmissions, the threshold is not reached yet.

Then, at t0+150 ms, communication node 10c has overheard only one retransmission which is less than the threshold and thus retransmits again the data message as message 31c on the timeline 30c.

Eventually, at t0+250 ms, communication node 10a having overheard 2 retransmissions of the data message, it prevents to transmit its own retransmission of the message 31a on timeline 30a.

In a third embodiment, the retransmission delay value is increased depending on a state of the communication apparatus. In an example, the state may depend on the remaining capacity of the routing table. When the routing table is nearly full, the retransmission delay is increased so that routes via other neighbours will be encouraged.

In a further example, upon determination that the routing table or the neighbour table of the communication apparatus is full or nearly full, the communication apparatus will decide not to participate at all in the retransmission. Thus, the delay selected would be in this case always 0, and the decision to retransmit always negative.

The method also allows dynamic and on-the-fly decisions. Due to the randomness in e.g. the retransmission interval, every time a new route discovery is processed, different sets of communication nodes may become intermediate communication nodes for different route discoveries. The advantage of such on-the-fly decisions is that load in the network is automatically shared among different sets of communication nodes. The load sharing can be further influenced by defining a more sophisticated decision rules. For example, a communication node with a high used space in its routing table can be more inclined to not to participate in an on-going route discovery process than its neighbouring communication nodes.

Besides, the decision made can incorporate some manual control aspects as well. For example, for a long corridor, it is beneficial if all communication nodes participate to route discoveries for improved network robustness. Such goals can be achieved by setting different rules or threshold values for those devices. In this case, the communication apparatus of the corridor may obtain a special state, for example a bottleneck communication node status. In this case, the transmission delay may be shortened. Further, it is possible for them to use special threshold values, to ensure that they always participate to the retransmissions. Such bottleneck state may be configured manually or deduced during the operation of the network. For example, in FIG. 1, it may be noticed that all routes to and from nodes 10g and 10h have to pass through node 10f, forming thus a bottleneck. Then, this communication node 10f will have this special status and always participate in the routing procedures.

Furthermore, the rules may be pre-configured to the communication nodes for general deployment. The rules may also be configured remotely by a network management entity.

The same method can be readily applied to ZigBee multicast or broadcast routing. The default behaviour for communication nodes configured as routers (in compilation time) is that every communication node will re-transmit a received broadcast/multicast message up to 3 times. And the only exception is that in the standard, the communication node shall not retransmit if all neighbours have retransmitted. Similarly to the unicast router determination, a decision can be made here by deciding on-the-fly whether a communication node should participate to the re-transmission of the on-going broadcast/multicast. Each communication node listens to whether its neighbouring nodes have already re-transmitted the broadcast/multicast message. If the number or percentage of the neighbouring nodes that have re-transmitted exceeds a threshold, then the node may decide not to participate to the broadcast/multicast routing process at all by refraining from all re-transmissions of this broadcast and clearing the state information in e.g. its broadcast transaction table that will not be used anymore.

Again similar to unicast routing, decision rules can be based on the observations and measurements made by a node of its neighbouring nodes, the statistics of the channel, e.g. the channel occupation ratio during the listening period, the nodes internal state information such as the queue length of transmission queues or the used space of broadcast routing tables. The decision rules can be a complex combination of a set of simple rules.

As a result, for each broadcast/multicast session, a different and small set of communication nodes will be active. Hence the congestion of broadcast/multicast routing in a dense lighting network can be reduced.

It is to be noted that the second and third embodiment can be combined. In this case, the retransmission delay interval can be selected on a plurality of parameters, like the link quality and the state of the communication apparatus, providing with some refinements in the selection of the time intervals.

Figure 4:
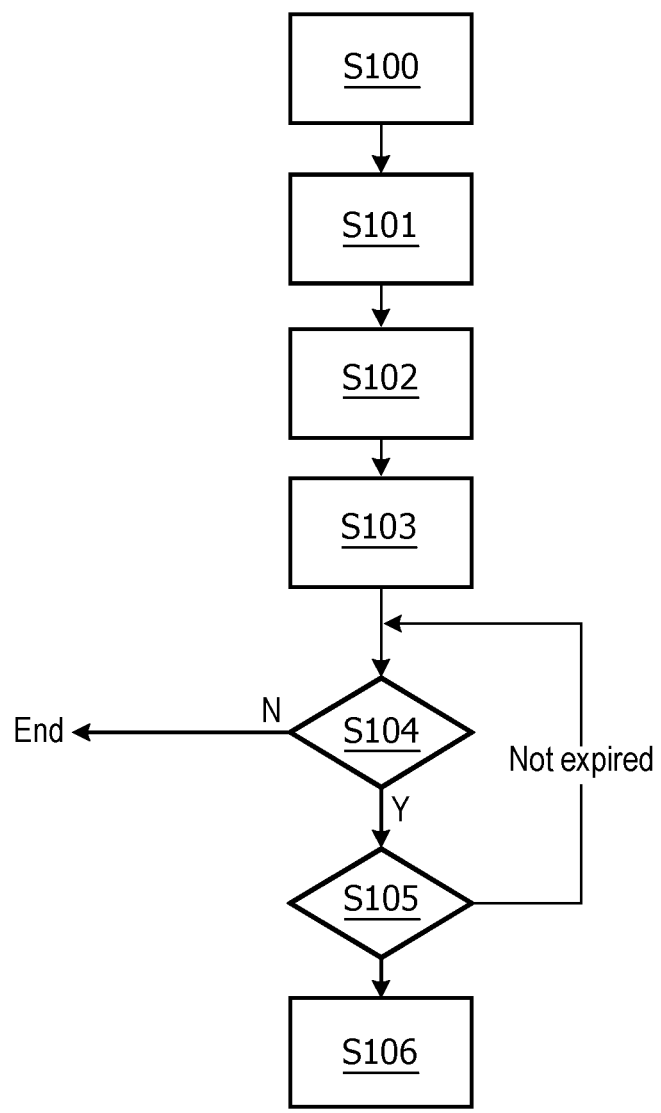
FIG. 4 is a flowchart representing a method in accordance with an embodiment of the invention.

As represented on FIG. 4, a method in accordance with a third embodiment of the invention starts at the reception of a new message at step S100. Then, the communication apparatus determines based on its status and/or a property of the message at S101. At step S102, a retransmission delay is then selected.

Then, until the expiry of the retransmission delay at step S105, the communication apparatus continuously monitors the channel to listen to incoming retransmissions at step S103. If the number of retransmissions is above a threshold at step S104, then the communication apparatus refrains from transmitting and ends the method. Else, the communication apparatus transmits its retransmission of the message at step S106 after the expiration of the delay.

It is to be noted that in another example of this embodiment, if at step S101, it is determined that the communication apparatus has a special status, e.g. the neighbour table or the routing table being full or nearly full, the delay selected may be zero and the decision of retransmitting is always negative (no retransmission). In this case, there is no monitoring period for the node.

Alternatively, if the communication apparatus has a special status (e.g. linked to the status of the routing/neighbour tables), the monitoring step is not carried out in view of this status and a retransmission of the message is then decided at the end of the selected delay interval based on the criterion alone.

The embodiments of the present invention allow a modified ZigBee stack to be still backward compatible with standard ZigBee devices. Hence interoperability with 3rd party ZigBee devices will not be jeopardized, which is very attractive from business standpoints.

In a further embodiment, the communication apparatus operates in a similar way as above except that it does not monitor the retransmissions. In this simplified embodiment, the communication apparatus upon reception of the incoming message decides to refrain from transmitting or to retransmit based on a retransmission delay which depends on some criterion, such as the status of the communication apparatus or some properties of the message. The status of the communication apparatus may be linked to the state of the neighbour table or routing table, such that a communication apparatus having a full (or nearly full) routing/neighbour table may decide not to retransmit or only after a delay selected from a delay interval including larger values. For example, a communication apparatus having a full routing table may decide, upon reception of the message not to participate to the retransmission (thus the retransmission delay is 0 ms but no retransmission). If the routing table is 80% full, the retransmission delay is selected from an interval [200-300 ms] whereas the retransmission delay is selected from an interval [0-200 ms] if the routing table is empty.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for operating a communication apparatus in a mesh network comprising a plurality of communication nodes, wherein
    upon reception of a message at the communication apparatus, the communication apparatus starting a retransmission delay being selected at random from a retransmission delay interval, said retransmission delay interval being dependent on at least one criterion including at least one of a status of the communication apparatus or at least one property of the received message,
    the communication apparatus depending on said criterion, monitoring retransmissions of said message by other communication nodes during said retransmission delay, and
    the communication apparatus decides on transmitting a retransmission of said message at the expiry of said retransmission delay based on the monitoring;
    wherein the communication apparatus comprises a neighbor table listing a plurality of communication nodes in communication range with the communication apparatus or a routing table listing a plurality of routes to communication nodes, wherein the status of the communication apparatus is based on the remaining space of the neighbor table or the remaining space of the routing table; and wherein the property of the received message is an indication of a link quality between the communication apparatus and a transmitting communication node transmitting said message;
    and wherein the retransmission delay interval includes lower retransmission delay values if the link quality is above a first threshold.

2. The method of claim 1, wherein the communication apparatus decides to transmit a retransmission of said message at the expiry of said retransmission delay if a statistic based on the retransmissions of said message by other communication nodes is below a threshold.

3. The method of claim 1, wherein the step of monitoring retransmissions of said message is carried out if the status of the communication apparatus is representative of remaining space on the neighbour table or the routing table.

4. The method of claim 1 wherein the status of the communication apparatus can take a value of at least one of the following states:
    routing table full;
    neighbour table full;
    remaining space in the routing table;
    and remaining space in the neighbour table.

5. The method of claim 1 wherein the retransmission delay interval includes greater retransmission delay values for lower remaining space of the routing table.

6. The method of claim 3, wherein the retransmission delay interval includes greater retransmission delay values for lower remaining space of the routing table or of the neighbour table.

7. The method of claim 5, wherein all the values of the retransmission delay interval are greater for lower remaining space of the routing table or of the neighbour table than the values of the retransmission delay interval for greater remaining space of the routing table or of the neighbour table.

8. The method of claim 3, wherein the status of the communication apparatus can take the value of bottleneck communication node, and wherein the retransmission delay interval includes lower values than for other statuses.

9. The method of claim 1 wherein the retransmission delay interval includes lower retransmission delay values if the link quality is included within a preferred link quality range.

10. The method of claim 1, wherein the message is a route discovery request used to record a route in the network between a source communication node and a destination communication node.

11. A communication apparatus for use in a mesh network comprising a plurality of communication nodes, the communication apparatus comprising
    a transceiver adapted to communicate with other communication nodes of the network-, said transceiver including a receiver and a transmitter,
    a controller adapted to,
    upon reception of a message by the receiver, start a retransmission delay being selected at random from a retransmission delay interval, said retransmission delay interval being dependent on at least one criterion including at least one of a status of the communication apparatus or at least a property of the received message,
    the communication apparatus depending on said criterion, monitoring retransmissions of said message by other communication nodes during said retransmission delay, and
    said controller deciding to generate a retransmission of said message to be transmitted by said transmitter of said message at the expiry of said retransmission delay based on the monitoring;
    wherein the communication apparatus comprises a neighbor table listing a plurality of communication nodes in communication range with the communication apparatus or a routing table listing a plurality of routes to communication nodes, wherein the status of the communication apparatus is based on the remaining space of the neighbor table or the remaining space of the routing table; and wherein the property of the received message is an indication of a link quality between the communication apparatus and a transmitting communication node transmitting said message;

wherein the communication apparatus comprises a neighbor table listing a plurality of communication nodes in communication range with the communication apparatus or a routing table listing a plurality of routes to communication nodes, wherein the status of the communication apparatus is based on the remaining space of the neighbor table or the remaining space of the routing table; and wherein the property of the received message is an indication of a link quality between the communication apparatus and a transmitting communication node transmitting said message;

and wherein the retransmission delay interval includes lower retransmission delay values if the link quality is above a first threshold.

* * * * *